(12) United States Patent
Mauler (10) Patent No.: US 10,142,744 B2
(45) Date of Patent: Nov. 27, 2018

(54) METHOD FOR OPERATING A HEARING DEVICE AND HEARING DEVICE

(71) Applicant: SIVANTOS PTE. LTD., Singapore (SG)

(72) Inventor: Dirk Mauler, Buckenhof (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 15/788,850

(22) Filed: Oct. 20, 2017

(65) Prior Publication Data

US 2018/0048968 A1 Feb. 15, 2018

Related U.S. Application Data

(63) Continuation of application No. 15/286,725, filed on Oct. 6, 2016, now Pat. No. 9,906,875.

(30) Foreign Application Priority Data

Oct. 9, 2015 (DE) .......................... 10 2015 219 572

(51) Int. Cl.
*H04R 25/00* (2006.01)
*H04S 7/00* (2006.01)
*G01P 1/02* (2006.01)

(52) U.S. Cl.
CPC ............ *H04R 25/552* (2013.01); *G01P 1/023* (2013.01); *H04R 25/407* (2013.01); *H04R 25/505* (2013.01); *H04S 7/304* (2013.01); *H04R 2225/41* (2013.01); *H04R 2225/61* (2013.01); *H04R 2460/03* (2013.01)

(58) Field of Classification Search
CPC ...... H04R 25/552; H04R 25/505; G01P 1/023

USPC ........................................ 381/23.1, 60, 312
See application file for complete search history.

(56) References Cited

U.S. PATENT DOCUMENTS

| 5,801,507 | A | 9/1998 | Nakamura | |
|---|---|---|---|---|
| 8,867,763 | B2 * | 10/2014 | Bouse | H04R 25/40 |
| | | | | 381/313 |
| 2007/0236704 | A1 * | 10/2007 | Carr | G01L 9/0079 |
| | | | | 356/519 |
| 2008/0288200 | A1 | 11/2008 | Noble | |
| 2009/0097683 | A1 | 4/2009 | Burns et al. | |
| 2010/0332181 | A1 * | 12/2010 | Jones | F41G 3/32 |
| | | | | 702/151 |
| 2012/0176865 | A1 * | 7/2012 | Schwarz | G01S 3/8083 |
| | | | | 367/103 |
| 2013/0329923 | A1 * | 12/2013 | Bouse | H04R 25/40 |
| | | | | 381/313 |

(Continued)

FOREIGN PATENT DOCUMENTS

| DE | 10007600 A1 * | 2/2000 |
|---|---|---|
| DE | 10007600 A1 | 6/2001 |
| DE | 102006028682 A1 | 1/2008 |

(Continued)

*Primary Examiner* — William A Jerez Lora
(74) *Attorney, Agent, or Firm* — Laurence A. Greenberg; Werner H. Stemer; Ralph E. Locher (57) ABSTRACT

A method operates a hearing device. The hearing device contains two acceleration sensors, which each provide a sensor signal and by which an orientation of the head of the user is established. The sensor signals of both acceleration sensors are used in combination for establishing the orientation, and an operating parameter of the hearing device is set depending on the orientation.

10 Claims, 3 Drawing Sheets

(56) References Cited

U.S. PATENT DOCUMENTS

2015/0230036 A1* 8/2015 Pedersen .............. H04R 1/1041
    381/330
2015/0289065 A1 10/2015 Jensen ................. H04R 25/552
    381/315

FOREIGN PATENT DOCUMENTS

DE    102012214081 A1    12/2013
EP         0744622 A1    11/1996
EP         2928210 A1    10/2015

* cited by examiner

METHOD FOR OPERATING A HEARING DEVICE AND HEARING DEVICE

CROSS-REFERENCE TO RELATED APPLICATION

This application is a continuation of patent application Ser. No. 15/286,725, filed Oct. 6, 2016; which was a continuation, under 35 U.S.C. § 119, of German patent application No. DE 10 2015 219 572.4, filed Oct. 9, 2015; the prior applications are herewith incorporated by reference in their entirety.

BACKGROUND OF THE INVENTION

Field of the Invention

The invention relates to a method for operating a hearing device. Furthermore, the invention relates to a corresponding hearing device.

By way of example, a hearing device is known from DE 10 2006 028 682 A1.

Hearing devices usually serve to record and amplify sound, and output the latter to a user who is usually hearing impaired. To this end, the hearing device comprises one or two hearing aids, which are each equipped with at least one microphone and a receiver, as well as a suitable signal processing unit for amplifying or, in general, modifying the recorded sound prior to the output.

The hearing device is worn essentially permanently by the user, usually on the head and in the vicinity of the ears. Then, the hearing aids are embodied as e.g. BTE instruments, which are worn behind the ear, or as ITE instruments, which are worn in the ear.

Moreover, the hearing device usually has a number of operating parameters which, in particular, determine the behavior of the signal processing apparatus and hence the modification of the recorded sound. An example of such an operating parameter is the gain factor, by means of which the recorded sound is amplified. A further example is the dimensioning of a directional lobe of the hearing system for adapting a directional characteristic to different situations. In principle, the hearing device should be set as ideally as possible in every sound situation, wherein different values for the operating parameters are often also advantageous in different sound situations.

The hearing device described in DE 10 2006 028 682 A1 is equipped with a sensor which, in one configuration, is embodied to detect an orientation or position of the hearing device in the surroundings thereof. As a result of this, it is possible to control the directional characteristic of the hearing device. If the user of the hearing device slightly rotates his head to a specific side over a certain amount of time, the assumption is made that he would prefer to receive signals from this side and the directional lobe is thereupon rotated into the corresponding direction.

SUMMARY OF THE INVENTION

Against this background, it is an object of the invention to specify a method for operating a hearing device, in which the orientation is established in an improved manner, i.e., in particular, it is established more accurately. Furthermore, a corresponding hearing device should be specified which, moreover, consumes as little energy as possible during operation and which should be as compact as possible.

According to the invention, this object is achieved by a method having the features in accordance with the main method claim and by a hearing device having the features in accordance with the main device claim. Advantageous configurations, developments and variants are the subject matter of the dependent claims. Here, the configurations and advantages in conjunction with the method apply analogously to the hearing device as well, and vice versa.

The method serves to operate a hearing device which, in particular, comprises a number of microphones for the purposes of recording sound, i.e. noises in particular, and, in particular, at least one receiver for outputting the recorded sound to a user of the hearing device. The latter moreover has two acceleration sensors, which each provide a sensor signal and by means of which an orientation of the head, i.e. the approximate viewing direction of a user of the hearing device in particular, is established during the method. Here, the sensor signals of both acceleration sensors are used in combination for establishing the orientation. Here, "used in combination" should mean that, in particular, the sensor signals of the two acceleration sensors are used in combination and precisely not separately from one another. Accordingly, the orientation is established on the basis of the sensor signals from both acceleration sensors in order to derive the orientation of the head from an overall consideration of precisely those sensor signals. The sensor signals of both acceleration sensors are, in this respect, used and evaluated simultaneously in particular. Finally, an operating parameter of the hearing device is set depending on the orientation. Here, in particular, the output of the recorded sound by way of the receiver is dependent on the operating parameter, i.e., the output of the hearing device specifically is modified by setting the operating parameter.

In particular, as a result of using two acceleration sensors, a substantial advantage of the invention consists of it also being possible to use those types of acceleration sensors which would otherwise only supply inaccurate measurement results in the case of a single or purely separate use but which supply a more accurate measurement result as a result of the combined use of a plurality of acceleration sensors. This is based on the idea that additional information, which reduces possible inaccuracies and/or measurement errors, is obtained in the case of a combined use of the sensor signals from a plurality of acceleration sensors when compared with the separate use of these sensor signals.

In principle, the method is also suitable for operation in a hearing device which does not have microphones and/or receivers, such as e.g. headphones, and it is therefore not restricted to hearing devices for aiding the hearing impaired.

In particular, it is also possible to then use so-called translational acceleration sensors, the sensor signals of which are usually influenced by the gravitational acceleration, as acceleration sensors in conjunction with a hearing device. The translations of the head to be expected in the field of application of the hearing device would only lead to a small signal component of the overall sensor signal in comparison with the gravitational acceleration in particular in the case of a translational acceleration sensor, and so the sensor signal of an individual acceleration sensor is afflicted with a large uncertainty in respect of the orientation. Hence, the gravitational acceleration leads to an impairment of the accuracy. However, this impairment can then be advantageously eliminated or else filtered out, or at least sufficiently reduced, by the combined use of the two sensor signals from two acceleration sensors.

Accordingly, a translational acceleration is measured, i.e., in general terms, established in particular, in each case by means of the acceleration sensors in accordance with a particularly preferred configuration. Expressed differently: the two acceleration sensors are preferably translational acceleration sensors. Particularly in relation to rotational acceleration sensors, so-called gyroscopic acceleration sensors, these are distinguished by significantly lower energy requirements and therefore particularly suitable for use in the case of a hearing device which is usually operated by batteries. Moreover, translational acceleration sensors regularly also require less installation space than typical rotational acceleration sensors and are therefore particularly suitable for use in a hearing device, also in view of the generally greatly restricted installation space therein. Overall, translational acceleration sensors are particularly energy-efficient and compact in relation to other acceleration sensors and therefore preferably installed in a hearing device which is typically sophisticated in this respect.

A translational acceleration sensor usually comprises a test mass, which is moved in the case of an acceleration and exerts a force in the process, for example on a lever arm. The force is then measured and assigned to a specific acceleration. In this case, the acceleration is typically measured in a Cartesian coordinate system with three axes which, in particular, are perpendicular to one another, i.e. in an X-, a Y- and a Z-direction. When determining a rotational movement like in the case of a change in the orientation of the head, corresponding accelerations in a radial direction, i.e. pointing toward, or away from, an axis of rotation of the head, and/or in a tangential direction, i.e. orthogonal to the axis of rotation and at a distance therefrom, emerge depending on the alignment of the sensor due to the usually fixed arrangement relative to the head. Accordingly, a translational acceleration sensor detects radial and/or tangential accelerations which, accordingly, are included in the sensor signal output by the acceleration sensor.

The orientation is established, in particular calculated, from the sensor signal by means of a suitable control unit. The orientation specifies an alignment of the head in respect of a fixed reference direction, preferably in respect of the gravitational acceleration. The orientation of the head is completely determined by a number of parameters, in particular by three angles relative to the reference direction, for example an angle of rotation about an axis of rotation for the left-right rotation, abbreviated to rotation of the head, a tilt angle about a tilt axis for the lateral tilt or left-right tilt, abbreviated to tilt of the head, and a nod angle about a nod axis for the forward-backward nodding, abbreviated to nodding of the head. Hence, the orientation is given by an orientation vector which contains the parameters and describes the orientation of the head relative to the reference direction, in particular unambiguously. In particular, the orientation corresponds to a direction which is a viewing direction of the user at the same time, provided the user looks frontally forward in respect of the plane of his face. If the user looks forward and his viewing direction is perpendicular to the gravitational acceleration, all three angles are 0°, in particular provided that the direction of the gravitational acceleration is selected as a reference direction. The sensor signals, too, are advantageously represented by a signal vector in each case and then specify an acceleration established by the respective acceleration sensor, said acceleration, in particular, being expressed in the reference system of the acceleration sensor.

The control unit establishes the orientation proceeding from the sensor signal, in particular by means of a differential equation in which the sensor signals, and hence the radial and/or tangential accelerations, are used as input parameters. The numerical integration, in particular, carried out in the process is typically particularly susceptible to faults or uncertainties of the sensor signal. In this case, a particular difficulty lies in the influence of the gravitational acceleration which, particularly in terms of magnitude, is often greater than the radial and/or translational acceleration in the case of a rotational, tilt or nodding movement of the head and therefore potentially leads to measurement errors which prevent an accurate calculation of the orientation. In particular, the gravitational acceleration is a cause of a permanently present background signal which is then contained in the sensor signals as an unwanted signal component. The gravitational acceleration would have no influence on the measurement in the radial direction and in the tangential direction only in the case of a rotation about an axis of rotation which exactly corresponds to the direction of the gravitational acceleration. However, this is at best of secondary importance since the axis of rotation in the practically relevant cases typically does not exactly correspond to the direction of the gravitational acceleration.

The combination of a plurality of sensor signals from a plurality of acceleration sensors however renders a more exact calculation of the orientation possible by way of a significant reduction in the inaccuracy of the calculation. To this end, the two sensor signals are combined to form an overall signal, by means of which the orientation of the head then is established. In the combination to form the overall signal, those measurement errors and background signals which occur to the same extent in both acceleration sensors in particular are advantageously eliminated and a pure useful signal remains as overall signal, said useful signal, in particular, being composed merely of radial and/or tangential accelerations which were caused by the movement of the head. Then, it is not the sensor signals that are used when calculating the orientation but the overall signal. Here, the combination to form the overall signal renders an improved establishment, i.e. a calculation of the orientation in particular, possible. This advantage comes particularly to bear when using translational acceleration sensors which, when used individually, at best render possible only an inaccurate determination of the orientation, in particular a less accurate determination when compared with rotational acceleration sensors.

The combination to form the overall signal is carried out by a mathematical operation in particular, i.e. the combination of the two sensor signals by means of a mathematical operator. In this case, an additive combination, in particular subtraction, is particularly suitable, namely in such a way that a measurement error or background signal, which is contained in both sensor signals, is precisely eliminated.

The combination of the sensor signals to form the overall signal is used particularly advantageously to eliminate a gravitational acceleration component from the sensor signals. Expressed differently: the two sensor signals each have a gravitational acceleration component and are combined to form the overall signal in such a way that the gravitational acceleration components are eliminated and the overall signal is independent of gravitational acceleration. In this way, the gravitational acceleration, as a substantial uncertainty and error source, and as a background signal when determining the orientation of the head, then is eliminated in a particularly efficient manner. By combining the two sensor signals, in particular by subtracting one of the sensor signals from the other sensor signal, the radial and/or tangential accelerations are combined constructively in the overall signal due to a specific orientation of the head, i.e. combined by addition in particular, whereas the gravitational acceleration components, i.e. signal components dependent on gravitational acceleration, are combined in a destructive manner and the overall signal then is free from a gravitational acceleration component. Thus, overall, the sensor signals are advantageously combined, in particular by forming a difference signal, to form the overall signal and signal components dependent on gravitational acceleration are eliminated, i.e. removed, as a result thereof.

The use of two acceleration sensors for determining the orientation of the head in the case of a hearing device embodied as a binaural hearing device is particularly advantageous. Said hearing device has two hearing aids, namely a left hearing aid and a right hearing aid, to be worn on different sides of the head, namely on a left side and on a right side in respect of the viewing direction. Then, one of the two acceleration sensors is in each case attached in or to one of the two hearing aids in each case, i.e. one acceleration sensor is positioned to the left of the head and the other acceleration sensor is positioned to the right of the head, such that the two sensor signals are provided as a left sensor signal and a right sensor signal. This arrangement leads to particular advantages in the common utilization of the sensor signals for the purposes of establishing the orientation: since the acceleration sensors are attached to opposite sides of the head, these respectively experience an acceleration in different directions in the case of a rotational movement, i.e. when rotating, tilting or nodding, whereas the gravitational acceleration is in the same direction for both acceleration sensors. As a result, this arrangement is particularly suitable for eliminating, by way of forming the difference, i.e. subtracting the sensor signals from one another, signal components dependent on gravitational acceleration. By way of example, when the head is turned to the left, the left acceleration sensor is accelerated backward in relation to the user as a result of this rotation and the right acceleration sensor is accelerated forward, while both are likewise accelerated downward due to the gravitational acceleration. When forming a difference of the sensor signals, the signal components which are due to rotating, tilting or nodding are then added, while the signal components due to gravitational acceleration are subtracted.

The respective sensor signal is dependent on the specific alignment of the respective acceleration sensor. In order to obtain a combination which is as ideal as possible, particularly for the purposes of eliminating the gravitational-acceleration-dependent signal components, the two acceleration sensors are advantageously aligned in such a way that the gravitational acceleration acts equally on these and both sensor signals then also have the same gravitational-acceleration-dependent signal components. However, depending on the installation situation of the acceleration sensors at different positions of the hearing device, such an exactly equal alignment is not necessarily provided. Also, particularly in the case of a binaural hearing device and taking account of the individual head form of a respective user and the way in which the user wears the hearing device, it is possible that the two acceleration sensors have a skew position relative to another, preventing an ideal, i.e. complete, elimination of measurement errors and unwanted, in particular gravitational-acceleration-dependent, signal components. Therefore, such a skew position of the acceleration sensors in relation to one another is advantageously compensated for. Here, in particular, the skew position is a relative alignment of the reference systems of the acceleration sensors and, in particular, structurally dependent preferred directions of the acceleration sensors, for example of a specific alignment of a suspension for the test mass. In particular, the skew position is compensated by means of the control unit and precisely not by a mechanical or physical rearrangement of the acceleration sensors or a realignment of the hearing aids of a binaural hearing device. Moreover, the compensation is carried out, in particular, still before the sensor signals are combined to form the overall signal.

In a first variant, the skew position is compensated after attaching the hearing device on the head of the user and then, for example, in the case of a subsequent switching-on process. This ensures that, after the removal and renewed putting-on of the hearing device, there is an ideal equalization, i.e. compensation, of a skew position which may possibly be different, said equalization being automatic in particular. Alternatively, or additionally, the compensation is also carried out by a user entry, for example by actuating an operating element, for example a switch.

In a suitable configuration, the skew position is compensated by virtue of at least one of the sensor signals being additionally transformed. As a result, the preferred direction of the one acceleration sensor is then, in particular, brought to coincide with the preferred direction of the other acceleration sensor, as it were in a virtual manner. From the mathematical point of view, the two sensor signals initially have different reference systems due to the skew position, said reference systems then being brought into correspondence by a transformation, for example by means of a rotation matrix, i.e. the respective individual X-, Y- and Z-directions are aligned in relation to one another, in particular in a manner pairwise parallel to one another. For this purpose, the one sensor signal in particular, more precisely the signal vector thereof, is transformed by the rotation matrix, i.e. multiplied in this case in particular, in order to transform the signal vector into the reference system of the other sensor signal. Alternatively, the sensor signals are expressed as quaternions and transformed by means of a suitable mathematical operation. In principle, the transformation is carried out by means of a mathematical operation.

Expediently, a calibration measurement, in which a long-term mean of the respective sensor signal is established, is carried out, particularly for parameterization purposes, i.e. for determining matrix parameters of the rotation matrix, but also generally in conjunction with the compensation of the skew position. Expressed differently: a long-term mean is formed in each case for both sensor signals, i.e. a temporal mean over a period of time of approximately 1 to 10 s, and these long-term means are used for a calibration measurement for compensating the skew position. This is based on the idea that a sensor signal is substantially determined by the gravitational acceleration when averaged over a sufficiently long period of time and in this way, depending on the actual long-term mean compared with the value of the gravitational acceleration known in advance, the alignment of the acceleration sensor relative to the gravitational acceleration can then be used. Therefore, the long-term mean values are used accordingly in the calibration measurement to calibrate the acceleration sensors by virtue of, initially, the individual skew position of each acceleration sensor relative to the gravitational acceleration being established and, subsequently, the two individual skew positions being used for determining the skew position of the two acceleration sensors relative to one another. The calibration measurement is expediently always carried out when the alignment of the acceleration sensors relative to one another has been changed, for example after removing the hearing aids of a binaural hearing device and putting them back on again. To this end, the calibration measurement is carried out, for example automatically, when the hearing device is switched on or else it is triggered during operation by an input or instruction by the user. In a suitable alternative thereto, the calibration measurement is carried out continuously during running operation, i.e., in particular, by continuous or regular averaging during operation.

In addition to a conventional control, for example by way of operating elements on the hearing device, the established orientation of the head enables, in particular, an automatic control of the hearing device depending on the current orientation and, in general, also depending on the movement of the head. Here, for the purposes of controlling the hearing device, an operating parameter of precisely said hearing device is then set in a manner dependent on the orientation. In a first variant, this allows the hearing device to be controlled by head movements or head gestures by the user such that the latter can undertake adjustments where necessary without having to operate separate operating elements. In a second variant, alternatively or additionally, the orientation is used directly, i.e. without an explicit user input in particular, to adjust the hearing device, in particular in combination with a classification, e.g. a classification of a sound situation in which the user is currently situated, in order then, as it were, to utilize the orientation as additional information during the classification.

In principle, hearing devices which have a directional characteristic such that the hearing device accentuates the sound which originates from a sound source from a specific direction in relation to sound from other directions are known. To this end, a plurality of microphones are usually used in combination with a so-called beamforming method. In the process, a directional lobe is formed, the latter being characterized by an alignment and a dimension, and this directional lobe is directed to a specific sound source in order to accentuate precisely this sound source in a targeted manner. The directional lobe is often initially aligned forward and in a viewing direction of the user. For the improved adjustment of such a directional lobe, use is advantageously made of the orientation of the head of the user. Expressed differently: the hearing device advantageously has a directional lobe for the directed recording of sound by means of a number of microphones and the operating parameter which is adjusted in a manner dependent on the orientation is a dimension or an alignment of the directional lobe.

In a particularly suitable configuration, the operating parameter is a dimension of the directional lobe, in particular a width, and this dimension is reduced if the user does not change the orientation of his head during a predetermined time interval. Thus, if the orientation remains approximately unchanged over a specific period of time, for example a plurality of seconds, the assumption is made that the user wishes to focus his attention on a currently selected sound source. Then, the width of the directional lobe is reduced in order to realize corresponding focusing and thereby mask or attenuate other sound sources in an improved manner.

Accordingly, the dimension is increased in a further suitable configuration should the user change the orientation of his head. In this case, the deduction is made that the user either wishes to withdraw his attention from the currently selected sound source or, alternatively, that the current sound source is moving relative to the user and should be tracked accordingly. In any case, an enlargement, in particular a broadening, of the directional lobe then advantageously leads to a larger detected region such that either other sound sources are once again perceived more strongly or a moving sound source is not lost or even tracked.

The hearing device is preferably embodied for use for a user with impaired hearing, for example a user with a hearing defect. Then, in particular, such a hearing device records sound from the surroundings of the user in order to output said sound in a modified and, in particular, amplified manner to the user and thus at least partly compensate the impaired hearing. To this end, the microphones convert the sound into suitable audio signals which are then processed, i.e. modified, by a signal processing unit and then reconverted into acoustic signals, i.e. sound, by the receiver. Expediently, the signal processing unit is connected to the control unit in such a way that the orientation established by the control unit is forwarded to the signal processing unit so as to adjust the operating parameter there. In one variant, the signal processing unit is part of the control unit.

Below, an exemplary embodiment is explained in more detail on the basis of a drawing.

DETAILED DESCRIPTION OF THE INVENTION

Figure 1:
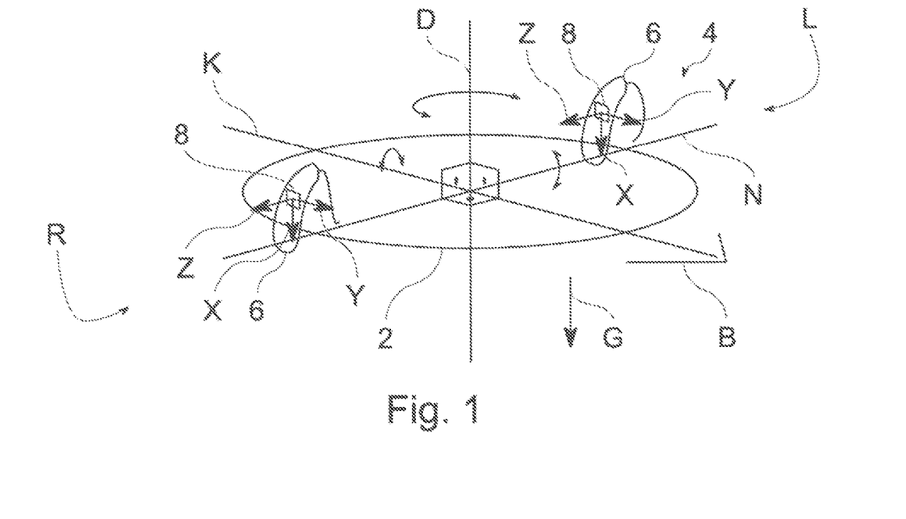
FIG. 1 shows a hearing device worn by a user.

FIG. 1 shows, in a perspective view and very schematically, the head 2 of a user (not shown in any more detail) wearing a hearing device 4 on his head 2, said hearing device being embodied as a binaural hearing device 4 in the shown exemplary embodiment. Accordingly, it has two hearing aids 6, which are arranged on a left side L and a right side R of the head 2. Here, the head 2 is aligned with a specific orientation relative to the gravitational acceleration G and, in particular, relative to the rest of the body (not depicted here) of the user as well, said orientation, in particular, being described by three angles, namely an angle of rotation which describes a left-right rotation of the head 2 about an axis of rotation D, a tilt angle which describes a lateral inclination, also left-right tilt of the head 2, about a tilt axis K, and a nod angle which describes forward-backward nodding of the head 2 about a nod axis N. Furthermore, FIG. 1 also shows the viewing direction B of the user, which is directed in the direction of the tilt axis K. In the orientation shown in FIG. 1, all three angles are 0° in each case, i.e. the user is looking straight ahead.

For the purposes of establishing the orientation, the hearing device 4 has two acceleration sensors 8. Here, these are embodied as translational acceleration sensors 8 for the detection of translational accelerations in three mutually perpendicular directions X, Y, Z, wherein, for example, a rotation about the axis of rotation D causes a radial acceleration in the Z-direction and a tangential acceleration in the Y-direction. The three directions X, Y, Z respectively form a reference system of the respective acceleration sensor 8, said reference system, in particular, being predetermined by design. One acceleration sensor 8 is housed in one of the hearing aids 6 in each case.

From FIG. 1, it becomes clear that a measurement of the acceleration in the Y- and Z-directions is independent of the gravitational acceleration G in the special situation depicted there, as said gravitational acceleration extends perpendicular to the Y- and Z-directions. However, this merely represents a special case. A situation similar to the situation shown in FIG. 2 would appear to be present substantially more frequently; herein, the head 2 is aligned in a different orientation, i.e. it is rotated in respect of the axis of rotation D, tilted in respect of the tilt axis K, and/or inclined in relation to the nod axis N. The acceleration sensors 8 are also oriented accordingly. Measuring the acceleration in the X-, Y-, and/or Z-directions then usually contains a component dependent on the gravitational acceleration G, i.e. a sensor signal output by the respective acceleration sensor 8 contains a gravitational-acceleration-dependent signal component.

Figure 2:
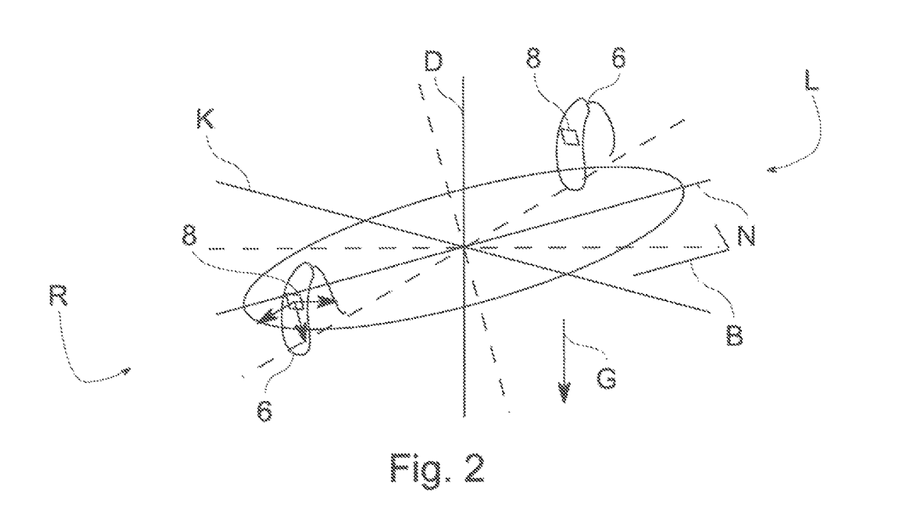
FIG. 2 shows the situation from FIG. 1 with the head in a different orientation.
Figure 3A:
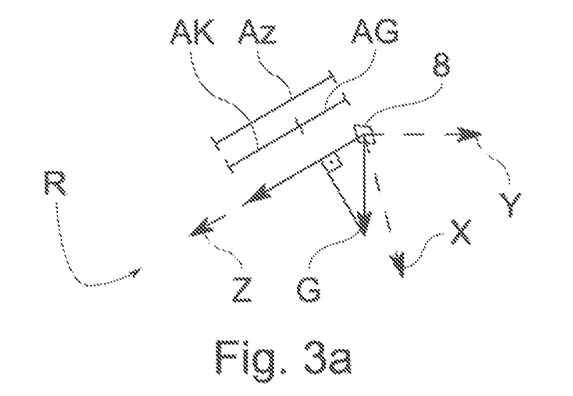
FIG. 3a shows a right acceleration sensor of the hearing device from FIG. 2.
Figure 3B:
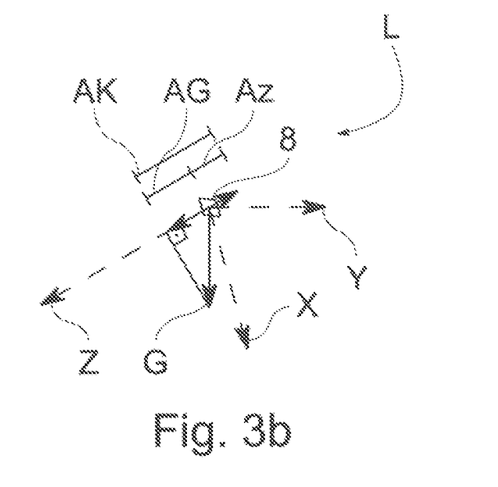
FIG. 3b shows a left acceleration sensor of the hearing device from FIG. 2.

For clarification purposes, FIGS. 3a and 3b each show one of the two acceleration sensors 8 from FIG. 2 and the directions X, Y, and Z, along which a measurement of translational accelerations is carried out. Here, the acceleration sensor 8 shown in FIG. 3a is arranged on the right side R of the head 2 and it outputs a right sensor signal; by contrast, the acceleration sensor 8 in FIG. 3b is arranged on the left side L of the head 2 and outputs a left sensor signal. From the example of a measurement of an acceleration Az in the respective Z-direction, it becomes clear that the gravitational acceleration G generates a component AG in the Z-direction which, together with a component AK caused by the actual movement of the head 2, forms the acceleration Az in FIG. 3a. A sensor signal formed on the basis of this acceleration Az contains a gravitational-acceleration-dependent signal component corresponding to the component AG and a useful component corresponding to the component AK. In FIGS. 3a and 3b, the component AK is depicted in a very much exaggerated fashion; usually, the gravitational-acceleration-dependent component AG is significantly larger and thus makes an accurate determination of the orientation on the basis of merely one sensor signal significantly more difficult.

By contrast, from FIG. 3b, it becomes clear that the component AK acts precisely counter to the gravitational-acceleration-dependent component AG on the left side L and therefore, overall, leads to a different acceleration Az. However, the component AG acts in the same direction for both acceleration sensors 8, and so the two gravitational-acceleration-dependent components AG are eliminated and the two components AK are correspondingly added in an overall signal resulting from this operation when forming the difference of the two sensor signals. In this way, an overall signal which is independent of the gravitational acceleration G is formed from the two sensor signals which emerge from the measured accelerations Az.

The two acceleration sensors 8 in FIGS. 3a and 3b are initially arranged relative to one another without a skew position. However, this ideal situation usually does not apply. Rather, the directions X, Y, Z for the respective acceleration sensor form a respective reference system and the two reference systems would appear precisely not to correspond to one another at regular occurrences. The components AG and hence the associated gravitational-acceleration-dependent signal components in the sensor signals from the two acceleration sensors 8 then are different, despite the gravitational acceleration G being the same per se.

Then, such a relative skew position of the acceleration sensors 8 relative to one another, and hence of the reference systems as well, is compensated in one embodiment by virtue of one of the sensor signals being transformed by way of a mathematical operation, in particular by a transformation with a rotation matrix, into the reference system of the other acceleration sensor 8. A calibration measurement is carried out for determining the rotation matrix, more precisely the matrix parameters thereof, but also, in general, for compensating the skew position. To this end, a long-term mean of the respective sensor signal is initially established. When forming a mean over a sufficiently long period of time, the sensor signal is substantially determined by the gravitational acceleration G, and so the direction of the gravitational acceleration G is then established as common reference direction on the basis of the long-term mean. For the purposes of compensating the skew position, the individual skew position of a respective acceleration sensor 8 is then initially established relative to the gravitational acceleration G in order subsequently to use the two individual skew positions for the purposes of determining the skew position of the two acceleration sensors 8 in relation to one another.

Figure 4:
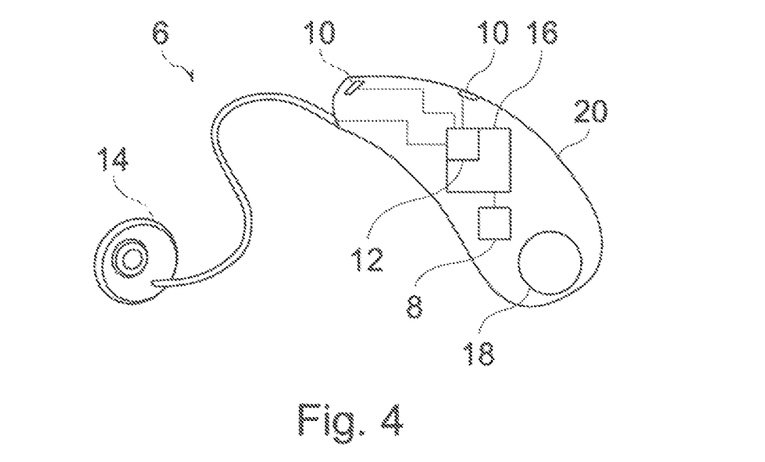
FIG. 4 shows a hearing aid of the hearing device from FIG. 1.

FIG. 4 shows one of the hearing aids 6 of the hearing device 4. In this case, the hearing aid 6 is embodied as a BTE instrument; however, in principle, other hearing aid types are also conceivable, such as e.g. ITE instruments, which are then worn in the ear. In the exemplary embodiment shown here, the hearing aid 6 has two microphones 10 for recording sound from the surroundings of the user. The microphones 10 are connected to a signal processing unit 12 which serves to modify and, in particular, amplify the recorded sound. The modified sound is then output by way of a receiver 14 which, to this end, is likewise connected to the signal processing unit 12. Moreover, the signal processing unit 12 is part of a control unit 16, to which, furthermore, the acceleration sensor 8 is connected. The hearing aid 6 is furthermore supplied with energy by way of a battery 18. The control unit 16, the signal processing unit 12, the battery 18, the acceleration sensor 8 and the microphones 10 are arranged in a housing 20 of the hearing aid 6, with the housing 20 in the embodiment of the hearing aid 6 as a BTE instrument shown here then being worn behind the ear. The receiver 14 is connected by way of a connection (not provided with a detailed label) to the housing 20 and inserted into the ear.

Figure 5:
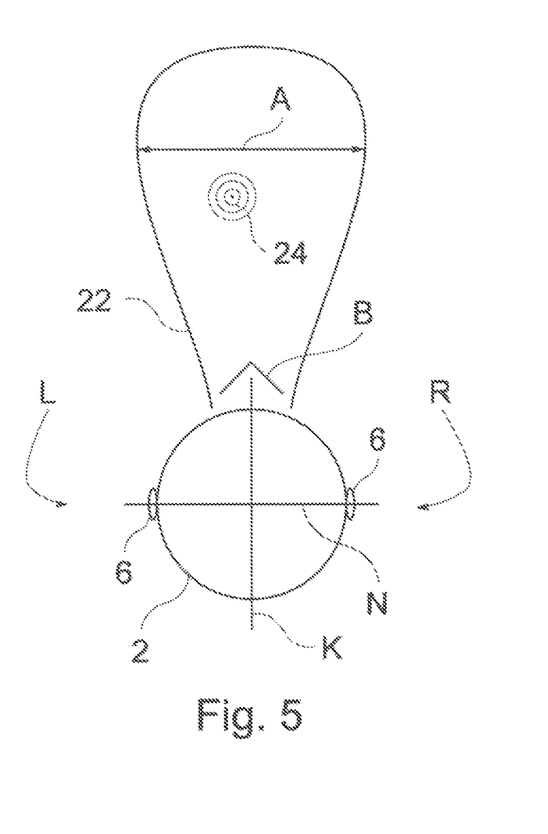
FIG. 5 shows the situation from FIG. 1, with a directional lobe of the hearing device.

The hearing device shown here moreover has a directional characteristic. For clarification purposes, FIG. 5 depicts the hearing device 4 from FIG. 2 in a top view, and also a directional lobe 22, of this hearing device 4, for the selective and directed recording of sound from a specific sound source 24 which, in this case, is arranged in front of the user. Here, the directional lobe 22 has a dimension A which is a width in this case and, in particular, specifies the region from which sound recorded in front of the user should be accentuated by means of the hearing device 4 in a targeted manner. Then, in the variant shown here, this dimension A is ideally set as an operating parameter in the hearing device 4 by establishing the orientation of the head 2. To this end, in particular, the orientation is regularly established and, within this meaning, monitored in order to determine a change in the orientation. If there is no change in the orientation over a predetermined period of time of e.g. a plurality of seconds, the assumption is made that the user wishes to focus his attention on the sound source 24 and wishes to mask other sound sources to the best possible extent. Therefore, the dimension A is then reduced in this case in order to align the directional lobe 22 only onto the sound source 24 where possible. However, if the user moves the head 2, the dimension A is increased again in order, correspondingly, to detect other sound sources or else follow the sound source 24, which is possibly moving out of the directional lobe 22. In a variant not shown here, an alignment of the directional lobe 22 in respect of the viewing direction B is also, alternatively or additionally, set in a manner dependent on the orientation of the head 2.

The following is a summary list of reference numerals and the corresponding structure used in the above description of the invention:

2 Head
4 Hearing device
6 Hearing aid
8 Acceleration sensor
10 Microphone
12 Signal processing unit
14 Receiver
16 Control unit
18 Battery
20 Housing
22 Directional lobe
24 Sound source
A Dimension
Az Acceleration
AG Component, gravitational-acceleration-dependent component
AK Component, useful component
B Viewing direction
D Axis of rotation
G Gravitational acceleration
K Tilt axis
L Left side
N Nod axis
R Right side
X, Y, Z Direction

The invention claimed is:

1. A method for operating a binaural hearing device containing two hearing aids including a left hearing aid and a right hearing aid to be worn on different sides of a head and having two translational acceleration sensors each providing a sensor signal being used to determine an orientation of the head of a user, which comprises the steps of:
    measuring a translational acceleration in each of the two translational acceleration sensors, each of the translational acceleration sensors is attached in or to one of the two hearing aids such that two sensor signals are provided as a left sensor signal and a right sensor signal;
    measuring the translational acceleration of each of the two translational acceleration sensors in a Cartesian coordinate system with three axes;
    using the sensor signals of both of the translational acceleration sensors in combination for establishing the orientation;
    combining the two sensor signals to form an overall signal, by means of the overall signal the orientation of the head is established, the two sensor signals each having a gravitational acceleration component and are combined to form the overall signal in such a way that gravitational acceleration components are eliminated and the overall signal is independent of gravitational acceleration;
    performing the combining step to form the overall signal by a mathematical operation; and
    setting an operating parameter of the binaural hearing device in dependence on the orientation.

2. The method according to claim 1, which further comprises compensating for a skew position of the translational acceleration sensors in respect of one another.

3. The method according to claim 2, which further comprises compensating for the skew position by virtue of at least one of the sensor signals being additionally transformed.

4. The method according to claim 1, wherein the binaural hearing device has a directional lobe for a directed recording of sound by means of a number of microphones, and in that the operating parameter is a dimension or alignment of the directional lobe.

5. The method according to claim 1, wherein the operating parameter is a dimension of a directional lobe and the dimension is reduced if the user does not change the orientation of the head of the user during a predetermined time interval.

6. The method according to claim 1, wherein the operating parameter is a dimension of a directional lobe and the dimension is increased if the user changes the orientation of the head of the user.

7. The method according to claim 1, wherein the binaural hearing device is embodied as a hearing aid system having at least one loudspeaker and a signal processing unit, by means of the signal processing unit a recorded sound is modified, prior to an output by means of the loudspeaker.

8. The method according to claim 4, wherein the dimension of the directional lobe is a width.

9. A binaural hearing device, comprising:
    two hearing aids including a left hearing aid and a right hearing aid to be worn on different sides of a head of a user;
    two translational acceleration sensors each providing a sensor signal and serving to determine an orientation of the head of the user; and
    a control unit for setting at least one operating parameter of the binaural hearing device, said control unit configured to:
        measure a translational acceleration by each of said two translational acceleration sensors, wherein each of said two translational acceleration sensors is attached in or to one of said two hearing aids such that two sensor signals are provided as a left sensor signal and a right sensor signal;
        measure the translational acceleration of each said two translational acceleration sensors in a Cartesian coordinate system with three axes;
        combine the two sensor signals of said translational acceleration sensors by a mathematical operation to form an overall signal, and by means of the overall signal the orientation of the head is established, the two sensor signals each have a gravitational acceleration component and are combined to form the overall signal in such a way that gravitational acceleration components are eliminated and the overall signal is independent of gravitational acceleration;
        perform a combining of the overall signal by using a mathematical operation; and
        set the operating parameter in dependence on the orientation.

10. The binaural hearing device according to claim 9, wherein each of said two translational acceleration sensors is a three-axis acceleration sensor.

* * * * *